US011050050B1

(12) United States Patent
Lai et al.

(10) Patent No.: US 11,050,050 B1
(45) Date of Patent: Jun. 29, 2021

(54) ELECTROLYTIC COPPER FOIL AND ELECTRODE AND LITHIUM-ION CELL COMPRISING THE SAME

(71) Applicant: CHANG CHUN PETROCHEMICAL CO., LTD., Taipei (TW)

(72) Inventors: Ting-Chun Lai, Taipei (TW); Yao-Sheng Lai, Taipei (TW); Jui-Chang Chou, Taipei (TW)

(73) Assignee: CHANG CHUN PETROCHEMICAL CO., LTD., Taipei (TW)

( * ) Notice: Subject to any disclaimer, the term of this patent is extended or adjusted under 35 U.S.C. 154(b) by 0 days.

(21) Appl. No.: 16/837,052

(22) Filed: Apr. 1, 2020

(30) Foreign Application Priority Data

Jan. 22, 2020 (TW) .................................. 109102500

(51) Int. Cl.
| | | |
|---|---|---|
| *H01M 4/1395* | (2010.01) | |
| *H01M 10/0525* | (2010.01) | |
| *C22F 1/08* | (2006.01) | |
| *C25D 1/04* | (2006.01) | |
| *H01M 4/04* | (2006.01) | |
| *H01M 4/66* | (2006.01) | |
| *H01M 4/02* | (2006.01) | |

(52) U.S. Cl.
CPC ............ *H01M 4/1395* (2013.01); *C22F 1/08* (2013.01); *C25D 1/04* (2013.01); *H01M 4/0404* (2013.01); *H01M 4/661* (2013.01); *H01M 10/0525* (2013.01); *H01M 2004/021* (2013.01); *H01M 2004/027* (2013.01); *H01M 2004/028* (2013.01)

(58) Field of Classification Search
CPC ......... H01M 4/1395; H01M 2004/021; H01M 2004/027; C25D 1/04; C22F 1/08
See application file for complete search history.

(56) References Cited

U.S. PATENT DOCUMENTS

2013/0147047 A1* 6/2013 Detzel ................ H01L 23/3735
257/762

FOREIGN PATENT DOCUMENTS

| CN | 106086945 | 3/2019 |
|---|---|---|
| JP | 2010-018885 | 1/2010 |
| JP | 2013-133514 | 7/2013 |
| JP | 5276158 | 8/2013 |
| JP | 2013-211229 | 10/2013 |
| JP | 2015-078428 | 4/2015 |
| JP | 2017-088971 | 5/2017 |
| JP | 2019-173139 | 10/2019 |
| TW | I649455 | 2/2019 |

OTHER PUBLICATIONS

Taiwan Examination Report dated Jul. 6, 2020.
Japan Examination Report, an Office Action of the corresponding JP application No. 2020-081132 dated Feb. 24, 2021.
Notice of Allowance for the KR counterpart, Korean application No. 10-2020-0053357 dated Apr. 2, 2021.

* cited by examiner

*Primary Examiner* — Ladan Mohaddes
(74) *Attorney, Agent, or Firm* — WPAT, PC (57) ABSTRACT

Provided are an electrolytic copper foil, an electrode, and a lithium-ion cell. The electrolytic copper foil comprising copper and chloride is analyzed by TOF-SIMS along its thickness direction to obtain a spectrum of a relative depth ratio as X-axis and a relative intensity of chloride versus copper as Y-axis. There is a chloride peak located between 20% and 80% of the relative depth ratio in the spectrum, and the chloride peak is characterized by a maximum relative intensity of chloride versus copper ranging from 0.77% to 5.13% and a full width at half maximum ranging from 2.31% to 5.78%. With above characteristics, the electrolytic copper foil has low density of copper particles, low degree of warpage, and good coating uniformity of the active material applied thereon, thereby optimizing the efficiency of a lithium-ion cell comprising the electrolytic copper foil.

20 Claims, 3 Drawing Sheets

FIG. 3

ELECTROLYTIC COPPER FOIL AND ELECTRODE AND LITHIUM-ION CELL COMPRISING THE SAME

CROSS-REFERENCE TO RELATED APPLICATION

Pursuant to 35 U.S.C. § 119(a), this application claims the benefit of the priority to Taiwan Patent Application No. 109102500 filed on Jan. 22, 2020. The content of the prior application is incorporated herein by its entirety.

BACKGROUND OF THE INVENTION

1. Field of the Invention

The invention relates to an electrolytic copper foil, particularly to an electrolytic copper foil for a lithium-ion cell. In addition, the invention also relates to an electrode comprising the electrolytic copper foil and a lithium-ion cell comprising the electrode.

2. Description of the Prior Arts

With the development of science and technology, there is a rising demand for energy, so the development of energy storage technologies has attracted much attention. A lithium-ion secondary cell (hereinafter referred to as the "lithium-ion cell") is an electrochemical energy storage system. The lithium-ion cell plays an important role in our daily lives because it has high capacity, high energy density, and no memory effect. The lithium-ion cell can be used to power not only portable electronics such as laptops, mobile phones, tablets, etc. but also electric vehicles.

A lithium-ion cell generally comprises a positive electrode, a negative electrode, an electrolyte, a separator, and a cell shell. Charging and discharging of the lithium-ion cell are accomplished by moving lithium ions back and forth between the positive electrode and the negative electrode. The negative electrode of the lithium-ion cell is usually produced by coating slurry including active material on both surfaces of an electrolytic copper foil. Therefore, the characteristics and the quality of the electrolytic copper foil have a great influence on the performance of the lithium-ion cell.

The slurry cannot be uniformly coated on the electrolytic copper foil if the warpage and the roughness of the electrolytic copper foil exceed an acceptable level, so the performance of the lithium-ion cell is degraded. In addition, a warped electrolytic copper foil coated with the slurry is prone to be wrinkled after rolling, so the electrolytic copper foil is unable to be subsequently used to produce an electrode of a lithium-ion cell and is difficult to apply to the field of lithium-ion cells.

SUMMARY OF THE INVENTION

To overcome the shortcomings, the objectives of the present invention are effectively mitigating or suppressing the degree of warpage of the electrolytic copper foil, improving the coating uniformity of the active material applied on the electrolytic copper foil, thereby optimizing the charge-discharge cycle life performance of the lithium-ion cell.

To achieve the aforementioned objectives, the present invention provides an electrolytic copper foil, which comprises copper and chloride. The electrolytic copper foil is analyzed by time of flight secondary ion mass spectrometry (TOF-SIMS) along its thickness direction to obtain a TOF-SIMS spectrum of a relative depth ratio as X-axis and a relative intensity of chloride versus copper as Y-axis, wherein the relative depth ratio refers to a ratio of an etch depth to the thickness of the electrolytic copper foil, and the relative intensity of chloride versus copper refers to a ratio of the intensity of the chloride to the intensity of the copper. There is a chloride peak located between 20% and 80% of the relative depth ratio in the TOF-SIMS spectrum, and the chloride peak is characterized by a maximum relative intensity of chloride versus copper ranging from 0.77% to 5.13% and a full width at half maximum (FWHM) ranging from 2.31% to 5.78%.

By controlling the values of the maximum relative intensity of chloride versus copper and the FWHM of the chloride peak located between 20% and 80% of the relative depth ratio in the TOF-SIMS spectrum of the electrolytic copper foil, the electrolytic copper foil has low density of copper particles, low degree of warpage, and good coating uniformity of the active material applied thereon, thereby optimizing the efficiency of a lithium-ion cell comprising the electrolytic copper foil.

In the present specification, TOF-SIMS analysis is performed by using cesium ions ($Cs^+$) as a sputter ion source and applying an acceleration voltage of 2000 electron volts in an etch area of 250 micrometers ($\mu m$)*250 $\mu m$.

Preferably, the electrolytic copper foil comprises copper particles on a surface thereof, a density of the copper particles with particle size ranging from 5 $\mu m$ to 100 $\mu m$ on the surface of the electrolytic copper foil is controlled at less than or equal to 5 particles per square meter (particles/$m^2$). In other words, the particle size of the copper particles of the electrolytic copper foil may not exceed 100 $\mu m$, and the density of the copper particles may be controlled within a range less than or equal to 5 particles/$m^2$. Controlling the density of the copper particles is helpful for improving the coating uniformity of the active material applied on the electrolytic copper foil. Further, a cell comprising the electrolytic copper foil may cope with problems generated by the localized discharge of an electrode, which is caused by copper particles.

Preferably, the maximum relative intensity of chloride versus copper of the chloride peak in the TOF-SIMS spectrum of the electrolytic copper foil may be further controlled within a range from 0.77% to 4.70% based on needs, and thus the density of the copper particles of the electrolytic copper foil may be controlled at less than or equal to 3 particles/$m^2$. More preferably, the maximum relative intensity of chloride versus copper of the chloride peak may range from 0.77% to 4.61%.

Preferably, the FWHM of the chloride peak in the TOF-SIMS spectrum of the electrolytic copper foil may be further controlled within a range from 2.31% to 4% based on needs, thereby decreasing the degree of warpage of the electrolytic copper foil and avoiding cracking or wrinkling of the electrolytic copper foil after rolling.

Preferably, a ratio of a maximum height to a ten-point mean roughness (Ry/Rz) of a surface of the electrolytic copper foil may be less than or equal to 1.75. By controlling the surface morphology of the electrolytic copper foil, the coating uniformity of the active material applied on the electrolytic copper foil may be improved, thereby enhancing the charge-discharge cycle life performance of a lithium ion cell. More preferably, the ratio of the maximum height to the ten-point mean roughness (Ry/Rz) of the surface of the electrolytic copper foil may be 1.09 to 1.7.

In one embodiment, the electrolytic copper foil may be a raw copper foil formed after an electrodeposition step. The raw copper foil is electrodeposited onto a titanium-made cathode drum by supplying copper electrolyte between the cathode drum and a dimensionally stable anode (DSA) and applying a direct current between them. The copper electrolyte contains main components of sulfuric acid and copper sulfate, and the DSA is a titanium plate coated with iridium or iridium oxide. As the electrolytic copper foil has deposited to a predetermined thickness, it is peeled off from the surface of the cathode drum and transported to a guide roller to be rolled. The raw copper foil has two opposite surfaces: one is called a "drum side," which faces toward the cathode drum in the preparation of the raw copper foil, and the other is called a "deposited side," which faces toward the copper electrolyte in the preparation of the raw copper foil.

In another embodiment, the electrolytic copper foil may be a copper foil which is surface-treated after an electrodeposition step. It comprises a raw copper foil and a surface-treated layer thereon. For example, the surface-treated layer may be an anti-tarnish layer. Specifically, the electrolytic copper foil comprises substantially no roughening-treated layer, that is, the raw copper foil formed by the electrodeposition step is not substantially performed with a roughening-treatment, which may be a black oxide treatment or a treatment comprising depositing roughened particles (e.g., copper-cobalt-nickel alloy particles or copper-nickel-phosphorus alloy particles). In other words, the above-mentioned electrolytic copper foil may be also called a "non-roughened electrolytic copper foil".

The present invention further provides an electrode for a lithium-ion cell. The electrode comprises the electrolytic copper foil mentioned above. In the TOF-SIMS spectrum of the electrolytic copper foil, there is a chloride peak with the aforementioned characteristics.

Furthermore, the present invention further provides a lithium-ion cell comprising the electrolytic copper foil mentioned above. In the TOF-SIMS spectrum of the electrolytic copper foil, there is a chloride peak with the aforementioned characteristics. The lithium-ion cell comprises a positive electrode, a negative electrode, and an electrolyte. In some embodiments, a separator separates the positive electrode and the negative electrode in the lithium-ion cell. Specifically, the lithium-ion cell of the present invention particularly refers to a lithium-ion secondary cell.

According to the present invention, the electrolytic copper foil may be suitable for a negative electrode and a positive electrode of a lithium-ion cell. The electrolytic copper foil may be suitable for a current collector. An electrode may be produced by a process comprising coating at least one layer of active material on either surface or both surfaces of the electrolytic copper foil.

According to the present invention, the active material may be divided into two categories: a positive electrode active material and a negative electrode active material. The negative electrode active material comprises a negative electrode active substance, which may be a carbon-containing substance, a silicon-containing substance, a silicon-carbon composite, a metal, a metal oxide, a metal alloy, or a polymer. Preferably, the negative electrode active substance may be the carbon-containing substance or the silicon-containing substance, but is not limited thereto. Specifically, the carbon-containing substance may be, but is not limited to, a non-graphitizing carbon, a coke, a graphite, a glasslike carbon, a carbon fiber, an activated carbon, a carbon black, or a highly polymerized calcined substance. The coke may comprise a pitch coke, a needle coke, a petroleum coke, etc. The highly polymerized calcined substance may be obtained by calcining a high polymer such as a phenol-formaldehyde resin or a furan resin at a suitable temperature for carbonation. The silicon-containing substance may be excellently capable of forming an alloy with lithium ions and extracting lithium ions from a lithium alloy. A lithium-ion secondary cell achieves high-energy density when incorporating the silicon-containing substance. The silicon-containing substance may be combined with cobalt (Co), iron (Fe), tin (Sn), nickel (Ni), copper (Cu), manganese (Mn), zinc (Zn), indium (In), silver (Ag), titanium (Ti), germanium (Ge), bismuth (Bi), antimony (Sb), chromium (Cr), ruthenium (Ru), molybdenum (Mo), or any combination thereof to form an alloy. The metal and elements of the metal alloy may be selected from the group consisting of Co, Fe, Sn, Ni, Cu, Mn, Zn, In, Ag, Ti, Ge, Bi, Sb, Cr, Ru, and Mo, but is not limited thereto. The metal oxide may be, but is not limited to, ferric oxide, ferric ferrous oxide, ruthenium dioxide, molybdenum dioxide, and molybdenum trioxide. The polymer may be, but is not limited to, polyacetylene and polypyrrole.

According to the present invention, the positive electrode active material comprises a positive electrode active substance. There are various options for the positive electrode active substance. Based on the positive electrode active substance used, the lithium-ion cell of the preset invention may be, but is not limited to, $LiCoO_2$ cell, $LiNiO_2$ cell, $LiMn_2O_4$ cell, $LiCo_xNi_{1-x}O_2$ cell, $LiFePO_4$ cell, etc.

According to the present invention, the electrolyte may comprise a solvent, an electrolyte salt, and an optional additive. The solvent may comprise, but is not limited to, a non-aqueous solvent, e.g., a cyclic carbonate ester such as ethylene carbonate (EC) or propylene carbonate (PC); a linear carbonate ester such as dimethyl carbonate (DMC), diethyl carbonate (DEC), or ethyl methyl carbonate (EMC); or a sultone. The solvent may be used alone or in combination of two or more.

According to the present invention, a lithium-ion cell may be a stacked lithium-ion cell comprising negative electrodes and positive electrodes stacked alternately and a separator sandwiched therebetween, or a spirally-wound lithium-ion cell comprising a coil of a continuous electrode and a separator therebetween, and is not particularly restricted. The lithium-ion cell of the present invention may be applied to a laptop, a mobile phone, an electric vehicle, and an energy storage system, wherein the energy storage system may be a cylindrical secondary cell, a square secondary cell, or a button-type secondary cell, and is not particularly restricted.

Other objectives, advantages and novel features of the invention will become more apparent from the following detailed description when taken in conjunction with the accompanying drawings.

DETAILED DESCRIPTION OF THE PREFERRED EMBODIMENTS

Several examples are exemplified below to illustrate the implementations of the electrolytic copper foil, the electrode, and the lithium-ion cell of the present invention, while several comparative examples are provided as comparison. A person skilled in the art can easily realize the advantages and effects of the present invention from the following examples and comparative examples. The descriptions proposed herein are just preferable embodiments for the purpose of illustrations only, not intended to limit the scope of the present invention. Various modifications and variations could be made in order to practice or apply the present invention without departing from the spirit and scope of the invention.

Examples 1 to 9: Electrolytic Copper Foils

Figure 1:
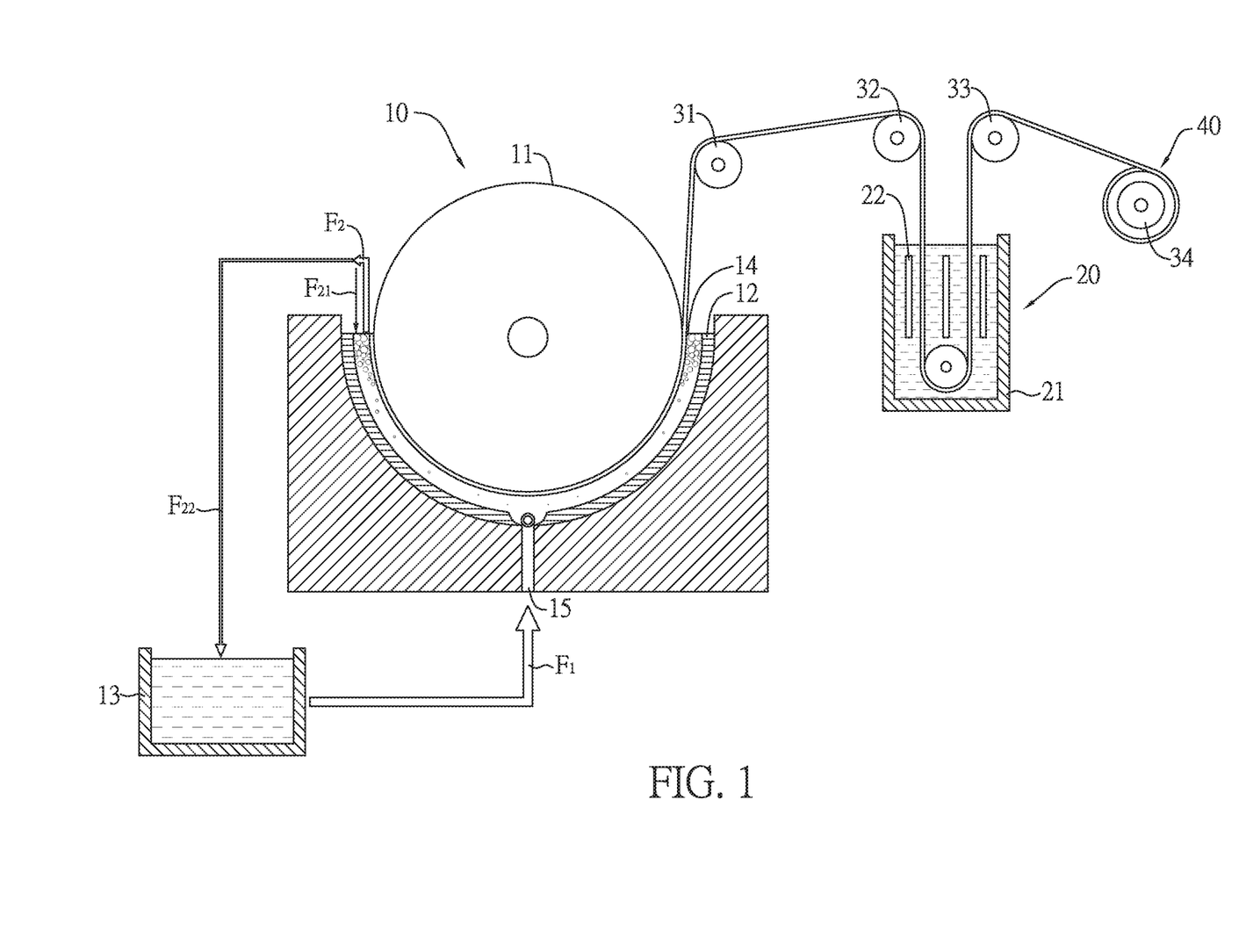
FIG. 1 is a schematic flow chart of producing electrolytic copper foils of Examples 1 to 9.

Electrolytic copper foils of Examples 1 to 9 were each produced by the production apparatus shown in FIG. 1 and through a substantially identical process comprising an electrodeposition step and an anti-tarnish treatment step in a sequential order.

As shown in FIG. 1, the production apparatus for producing electrolytic copper foils comprises an electrodeposition device 10, a surface treatment device 20, and a series of guide rollers. The electrodeposition device 10 comprises a cathode drum 11, a dimensionally stable anode 12, an electrolyte tank 13, a copper electrolyte 14, and a feed pipe 15. The cathode drum 11 is rotatable and a surface thereof is optionally mechanically polished by a buff (not shown). The dimensionally stable anode 12 is positioned below the cathode drum 11 and substantially surrounds the lower half of the cathode drum 11. The cathode drum 11 and the dimensionally stable anode 12 are spaced apart from each other to accommodate the copper electrolyte 14 from the electrolyte tank 13, wherein the copper electrolyte 14 is introduced through the feed pipe 15. The surface treatment device 20 includes a treatment tank 21 and electrode plates 22 provided therein. In addition, the series of guide rollers comprises a first guide roller 31, a second guide roller 32, a third guide roller 33, and a fourth guide roller 34, which transport a raw copper foil to the treatment tank 21 and finally to the fourth guide roller 34 where an electrolytic copper foil 40 is wound.

The method for manufacturing the electrolytic copper foils of Examples 1 to 9 by using the production apparatus shown in FIG. 1 is described as follows.

Firstly, the copper electrolyte 14 used in the electrodeposition step was prepared. During the electrodeposition step, the amounts of inflow $F_1$ and internal inflow $F_{21}$ of the copper electrolyte 14 were both controlled, the cathode drum 11 was rotated about a fixed axis at a constant speed, and copper ions in the copper electrolyte 14 were electrodeposited on the surface of the cathode drum 11 to form the raw copper foil by applying a direct current between the cathode drum 11 and the dimensionally stable anode 12. The raw copper foil was then peeled off from the cathode drum 11 and transported to the first guide roller 31.

For a process producing a raw copper foil continuously, the copper electrolyte 14 could be recycled and reused. An inflow $F_1$ of the copper electrolyte 14 from the electrolyte tank 13 was continuously fed into the space between the cathode drum 11 and the dimensionally stable anode 12 through the feed pipe 15. As the level of the copper electrolyte 14 rose above the dimensionally stable anode 12, the copper electrolyte 14 was overflowed, which was marked as overflow $F_2$ in FIG. 1. A part of the overflow $F_2$, represented by the internal inflow $F_{21}$, reflowed to the electrodeposition device 10, and the rest of the overflow $F_2$, represented by the reflux flow $F_{22}$, was drawn back into the electrolyte tank 13 for re-entering the space between the cathode drum 11 and the dimensionally stable anode 12 through the feed pipe 15. Herein, the overflow $F_2$ was the sum of the internal inflow $F_{21}$ and the reflux flow $F_{22}$.

The composition of the copper electrolyte 14 and the parameters of the electrodeposition step are described as follows:

(1) The composition of the copper electrolyte 14:
  copper sulfate ($CuSO_4 \cdot 5H_2O$): 320 grams per liter (g/L);
  sulfuric acid: 110 g/L;
  hydroxyethyl cellulose (abbreviated as HEC, purchased from DAICEL Corporation): 1.5 milligrams per liter (mg/L);
  low molecular weight gelatin (SV, purchased from Nippi Inc., with a molecular weight between 4000 Daltons (Da) and 7000 Da): 3.5 mg/L;
  sodium 3-mercaptopropanesulphonate (abbreviated as MPS, purchased from Hopax Company): 4.1 mg/L;
  chloride ions (from hydrochloric acid, purchased from RCI Labscan Ltd.): 25 mg/L; and
  polyethylene glycol/polypropylene glycol alkyl ether (used as a defoamer, purchased from Chang Chun Petrochemical Co., Ltd.): 100 mg/L to 1000 mg/L.

(2) The parameters of the electrodeposition step:
  total flow of the copper electrolyte 14: 500 liters per minute (L/min) to 1300 L/min;
  recycle ratio of the copper electrolyte 14: 0.63 to 1.50;
  temperature of the copper electrolyte 14: 50° C.; and
  current density: 35 amperes per square decimeter ($A/dm^2$).

Herein, the total flow of the copper electrolyte 14 refers to the sum of the inflow $F_1$ and the internal inflow $F_{21}$; the recycle ratio of the copper electrolyte 14 refers to a ratio of the internal inflow $F_{21}$ to the inflow $F_1$.

Secondly, the as-electrodeposited raw copper foil was transported to the surface treatment device 20 through the first guide roller 31 and the second guide roller 32 to carry out an anti-tarnish treatment, wherein the raw copper foil was immersed in the treatment tank 21 that is filled with an anti-tarnish solution comprising chromium ions, and then electrodeposited a chromium anti-tarnish layer on the drum side and the deposited side of the raw copper foil.

The composition of the anti-tarnish solution and the parameters of the anti-tarnish treatment step are described as follows:

(1) The composition of the anti-tarnish solution:
  chromic acid ($CrO_3$): 2.0 g/L;
(2) The parameters of the anti-tarnish treatment step:
  temperature of the anti-tarnish solution: 25° C.;
  current density: 0.5 $A/dm^2$; and
  processing time: about 2 seconds.

After the raw copper foil completed the anti-tarnish treatment, it was transported to the third guide roller 33 for drying, and then wound on the fourth guide roller 34 as the electrolytic copper foil 40 with a thickness of about 8 µm.

According to the above-mentioned method, it should be noted that the electrolytic copper foils 40 of Examples 1 to 9 were not roughened.

Comparative Examples 1 to 9: Electrolytic Copper Foils

Comparative Examples 1 to 9 were prepared in a manner similar to the method described above, except that one of the following parameters was not within the range mentioned above: the total flow of the copper electrolyte, the recycle ratio of the copper electrolyte, and the concentration of the defoamer in the copper electrolyte. The parameters for Comparative Examples 1 to 9 were shown in Table 1 below.

Test Example 1: Analysis of Time of Flight Secondary Ion Mass Spectrometry (TOF-SIMS)

In this test example, the electrolytic copper foils of Examples 1 to 9 and Comparative Examples 1 to 9 were used as test samples. The test samples were each placed on a stage and etched along the thickness direction from the top surface thereof by a time-of-flight secondary ion mass spectrometer (brand: German ION-TOF; model: TOF-SIMS V).

The parameters of etching are described as follows:
primary ions (a sputter ion source): $Cs^+$;
secondary ions (detected ions): $^{35}Cl^-$, $^{63}Cu^-$;
acceleration voltage: 2000 electron volts (2 k eV);
etch direction: from the top surface of a test sample (near the deposited side of the raw copper foil) toward the bottom surface of a test sample (near the drum side of the raw copper foil);
etch area: 250 μm*250 μm.

Two TOF-SIMS original spectra were obtained after analyzing each of the test samples by the above-mentioned method: one is a spectrum of the etch time as X-axis and the intensity of chloride ion as Y-axis, and the other is a spectrum of the etch time as X-axis and the intensity of copper ion as Y-axis; for clarity, the former was called the first original spectrum, and the latter was called the second original spectrum. In this test example, an endpoint of etching was determined by a moment immediately before observing an abrupt peak in the second original spectrum, and the moment indicated that an interface between the electrolytic copper foil and the stage had been etched.

Herein, it can be understood that the total etch time spent from the top surface of a test sample to the endpoint of etching corresponds to the thickness of the electrolytic copper foil, i.e., in the first and the second original spectra, the etch time indicated by the X-axis corresponds to an etch depth of the electrolytic copper foil.

The first and the second original spectra were processed to obtain a TOF-SIMS spectrum of a relative depth ratio as X-axis and relative intensity of chloride versus copper as Y-axis. The relative depth ratio was calculated by dividing the etch depth by the thickness of the electrolytic copper foil and then multiplying by 100%. The above calculation was identical to the following: dividing the etch time by the total etch time and then multiplying by 100%. The relative intensity of chloride versus copper was calculated by dividing the intensity of chloride in the first original spectrum by the intensity of copper in the second original spectrum and then multiplying by 100%.

Figure 2:
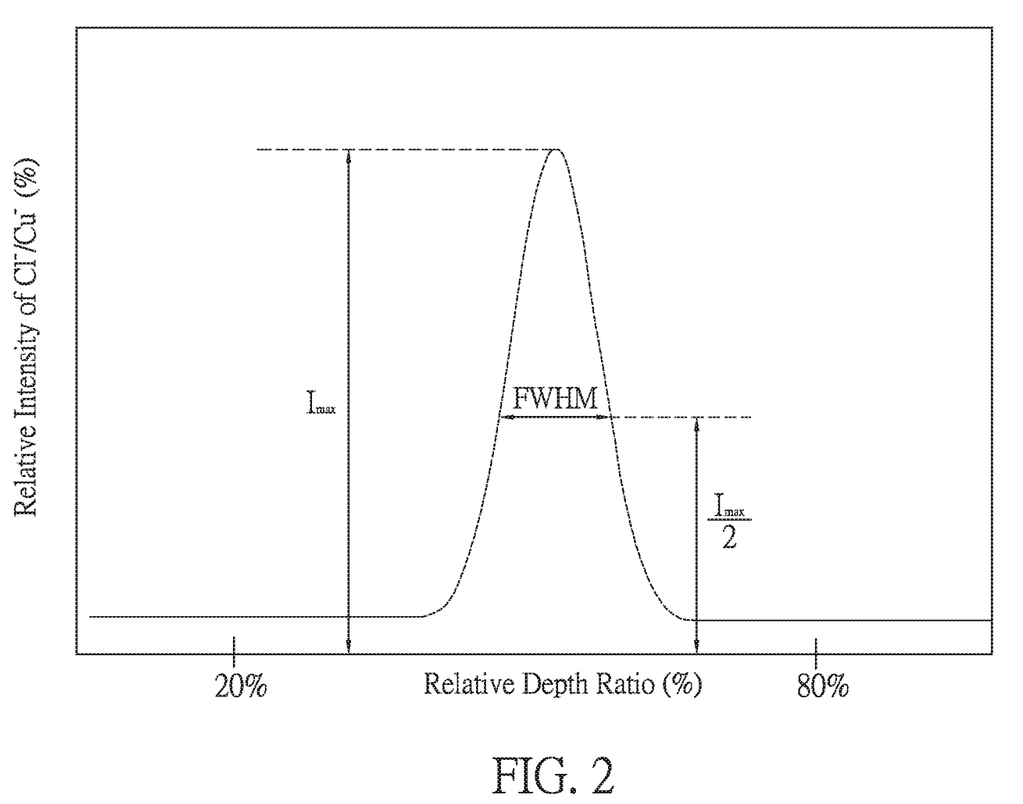
FIG. 2 is a schematic diagram for the TOF-SIMS spectrum of each of the electrolytic copper foils of Examples 1 to 9.

FIG. 2 is an example for illustrating the TOF-SIMS spectrum of each of the test samples. There is a chloride peak located between 20% and 80% of the relative depth ratio. The maximum relative intensity of chloride versus copper ($I_{max}$) of the chloride peak refers to the maximum for the intensity of chloride over the intensity of copper. The full width at half maximum (FWHM) of the chloride peak refers to the difference between two relative depth ratios at half of the maximum relative intensity of chloride versus copper ($I_{max}/2$). It should be noted that the two relative depth ratios corresponding to $I_{max}/2$ of the chloride peak can be alternatively obtained by interpolation when there is no data point of the relative depth ratio at half of the maximum relative intensity on the chloride peak, and FWHM can be calculated by the difference of the two relative depth ratios.

Figure 3:
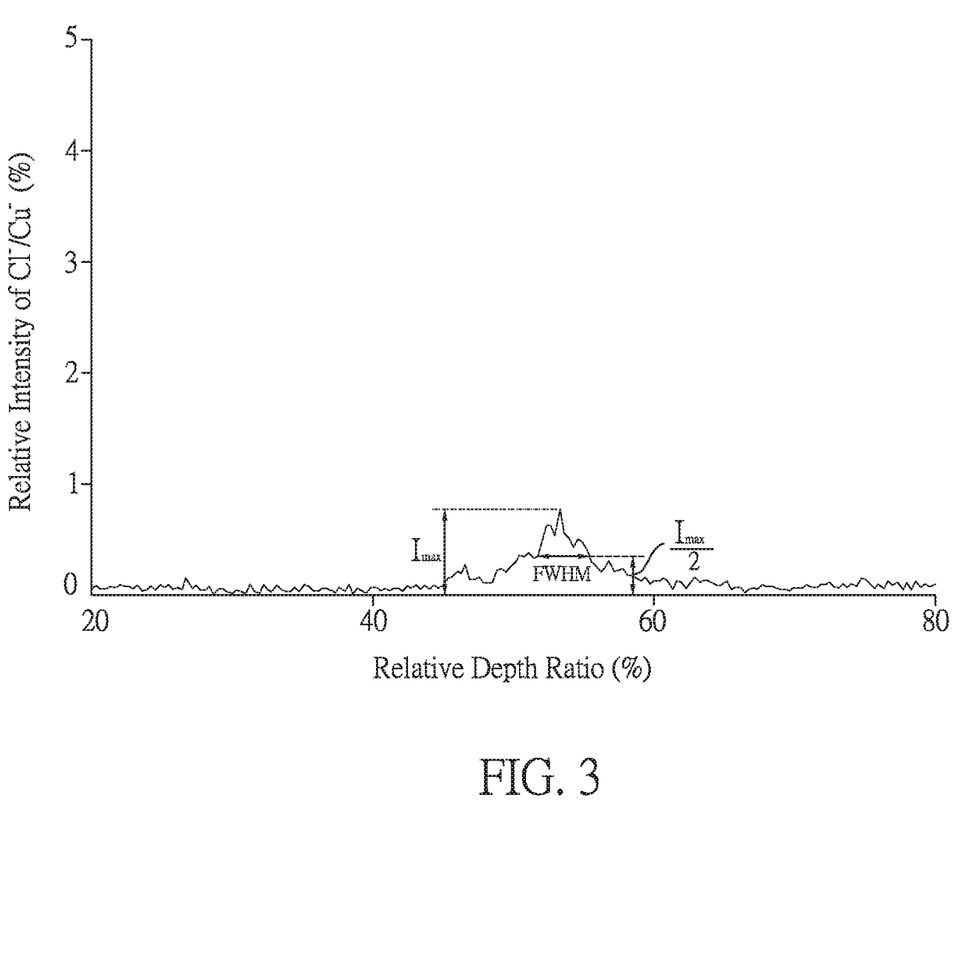
FIG. 3 is the TOF-SIMS spectrum of the electrolytic copper foil of Example 8.

As exemplified in FIG. 3, a TOF-SIMS spectrum of the electrolytic copper foil of Example 8, the maximum relative intensity of chloride versus copper is 0.77%, and the FWHM is 3.15%.

It should be noted that in addition to the etch direction mentioned above, etching could also be performed from the top surface of a test sample (near the drum side of a raw copper foil) toward the bottom surface of a test sample (near the deposited side of a raw copper foil). For each of the TOF-SIMS spectra obtained by the aforementioned method, the etch direction does not have influence on the maximum relative intensity of chloride versus copper and the FWHM of the chloride peak, that is, similar or even identical values of the maximum relative intensity of chloride versus copper and the FWHM could be obtained by etching in opposite directions.

The maximum relative intensity of chloride versus copper and the FWHM of the chloride peak in each of the TOF-SIMS spectra of the test samples were shown in Table 1 below.

Test Example 2: Surface Roughness

In this test example, the electrolytic copper foils of Examples 1 to 9 and Comparative Examples 1 to 9 were used as test samples. A maximum height (Ry) and a ten-point mean roughness (Rz) of either surface (e.g., the drum side or the deposited side) of each of the test samples were measured by an α-type surface roughness measuring device (brand: Kosaka Laboratory, model: SE1700) according to JIS B 0601 standard (1994).

The parameters of the test example are described as follows:
radius of curvature of the probe tip: 2 μm;
cone angle of the probe tip: 90°;
cutoff (λc): 0.8 millimeters (mm); and
sampling length: 4 mm.

Test Example 3: Density of Copper Particles

In this test example, an area of 1 $m^2$ was arbitrarily cut and used as a test sample from each of the electrolytic copper foils of Examples 1 to 9 and Comparative Examples 1 to 9. An image of each of the test samples was taken by a charge-coupled device (CCD) camera. The image was then magnified and observed with naked eyes to calculate the number of copper particles with particle size ranging from 5 μm to 100 μm. Herein, the longest distance between two opposite sites on the surface of a copper particle was taken as the particle size of the copper particle. The density of the copper particles of each of the test samples was shown in Table 1 below.

Test Example 4: Degree of Warpage

In this test example, an area of 100 mm*100 mm was arbitrarily cut and used as a test sample from each of the electrolytic copper foils of Examples 1 to 9 and Comparative Examples 1 to 9. Each of the test samples was placed on a table, and four corners of each of the test samples were free to warp upward from the table. The distance between each of the four corners and the table was measured with a ruler, and the highest value measured was defined as the degree of warpage of the electrolytic copper foil. The results were shown in Table 1 below.

Examples 1A to 9A and Comparative Examples 1A to 9A: Negative Electrodes

The two opposite outermost surfaces of each of the electrolytic copper foils of Examples 1 to 9 and Comparative Examples 1 to 9 were coated with negative electrode slurry containing a negative electrode active substance to produce a negative electrode for a lithium-ion cell.

Specifically, the negative electrode could be substantially produced by the following steps.

First, 100 g negative electrode active material and 60 g solvent (N-methyl-2-pyrrolidone (NMP)) were mixed at a solid-liquid ratio of 100:60 to prepare the negative electrode slurry. Based on the total weight of the negative electrode active material, the negative electrode active material comprised:

93.9 wt % negative electrode active substance (Mesophase Graphite Powder, MGP);

1 wt % conductive additive (conductive carbon black, Super P®);

5 wt % solvent-based adhesive (polyvinylidene difluoride, PVDF 6020); and 0.1 wt % oxalic acid.

Next, the two opposite outermost surfaces of the electrolytic copper foil were respectively coated with the aforementioned negative electrode slurry, dried in an oven, and then rolled by a rolling machine to obtain the negative electrode.

The parameters of producing the negative electrode are described as follows:

coating rate: 5 m/min;
coating thickness: about 200 μm for either of the two opposite outermost surfaces;
drying temperature: 200° C.;
rolling speed: 1 m/min;
rolling pressure: 3000 pounds per square inch (psi);
size of rollers in a rolling machine: 250 mm (outer diameter, φ)*250 mm (width);
hardness of the rollers: 62 HRC to 65 HRC; and
material of the rollers: high-carbon chromium bearing steel (SUJ2).

The negative electrodes of Examples 1A to 9A and Comparative Examples 1A to 9A were respectively made from the electrolytic copper foils of Examples 1 to 9 and Comparative Examples 1 to 9 by the method mentioned above.

Test Example 5: Coating Uniformity

In this test example, the negative electrodes of Examples 1A to 9A and Comparative Examples 1A to 9A were each sampled and then evaluated. Take the negative electrode of Example 1A as an example. The sampling was performed as follows: first of all, five regions were respectively chosen from the center as well as the top, bottom, left, and right of the center of the negative electrode; subsequently, five test samples each sized 5 centimeters (cm)*5 cm were cut from the five regions. Then, the five test samples were evaluated based on the weight deviation thereof, i.e., dividing the weight difference between the heaviest test sample and the lightest one among the five test samples by the average weight of the five test samples and then multiplying by 100%.

$$\text{Weight Deviation (\%)} = \frac{\text{weight of the heaviest test sample} - \text{weight of the lightest test sample}}{\text{average weight of the five test samples}} \times 100\%$$

If the weight deviation is less than 3%, it means the negative electrode has good coating uniformity, which is represented by a symbol "O" in Table 1 below. If the weight deviation is greater than or equal to 3%, it means the negative electrode has poor coating uniformity, which is represented by a symbol "X" in Table 1 below.

Examples 1B to 9B and Comparative Examples 1B to 9B: Lithium-Ion Cells

The negative electrodes of Examples 1A to 9A and Comparative Examples 1A to 9A were respectively combined with a positive electrode to produce lithium-ion cells of Examples 1B to 9B and Comparative Examples 1B to 9B.

Specifically, the positive electrode could be substantially produced by the following steps.

First, 100 g positive electrode active material and 195 g NMP were mixed at a solid-liquid ratio of 100:195 to prepare positive electrode slurry. Based on the total weight of the positive electrode active material, the positive electrode active material comprised:

89 wt % positive electrode active substance ($LiCoO_2$);

5 wt % conductive additive (flaked graphite, KS6);

1 wt % conductive additive (conductive carbon black, Super P®); and 5 wt % solvent-based adhesive (polyvinylidene difluoride, PVDF 1300).

Next, the positive electrode slurry was coated on an aluminum foil. After the solvent in the positive electrode slurry was evaporated, the positive electrode and the negative electrode were cut into a specific size, alternately stacked on each other with a microporous separator (model: Celgard 2400, purchased from Celgard, LLC) sandwiched therebetween, positioned in a pressing mold (model: LBC322-01H, purchased from Shenzhen Capchem Technology Co., Ltd.) filled with the electrolyte, and then sealed to form a laminate-type lithium-ion cell with a size of 41 mm*34 mm*53 mm.

Test Example 6: Charge-Discharge Cycle Life Performance

In this test example, the lithium-ion cells of Examples 1B to 9B and Comparative Examples 1B to 9B were evaluated for the charge-discharge cycle life performance.

The test example was carried out under the following condition:

charging mode: constant current-constant voltage (CCCV);
discharging mode: constant current (CC);
charging voltage: 4.2 volts (V);
charging current: 5 C;
discharging voltage: 2.8 V;
discharging current: 5 C; and
test temperature: 55° C.

A charge-discharge cycle life of a lithium-ion cell was defined as the number of charge-discharge cycles performed when the capacity of the lithium-ion cell dropped to 80% of its initial capacity. The charge-discharge cycle life of the lithium-ion cells of Examples 1B to 9B and Comparative Examples 1B to 9B, which comprised the electrolytic copper foils of Examples 1 to 9 and Comparative Examples 1 to 9, respectively, was shown in Table 1 below.

Table 1: Parameters of producing the electrolytic copper foils of Examples 1 to 9 (E1 to E9) and Comparative Examples 1 to 9 (C1 to C9), properties of the aforementioned electrolytic copper foils, and properties of the negative electrodes and the lithium-ion cells comprising the same

| | Copper Electrolyte | | | Electrolytic Copper Foil | | | | | Lithium-ion Cell |
|---|---|---|---|---|---|---|---|---|---|
| | | | | Max. relative Intensity of Cl⁻/ | FWHM | | Density | | Charge-Discharge |
| Sample No. | Total Flow (L/min) | Recycle Ratio | Conc. of Defoamer (mg/L) | Cu⁻ of the Chloride Peak (%) | of the Chloride Peak (%) | Ry Rz | of Cu Particles (No./m²) | Degree of Warpage (mm) | Negative Electrode Coating Uniformity | Cycle Life Performance (No.) |
| E1 | 500 | 0.67 | 100 | 4.61 | 5.78 | 1.09 | 3 | 3 | O | 1037 |
| E2 | 900 | 0.70 | 100 | 4.21 | 3.97 | 1.24 | 3 | 2 | O | 1018 |
| E3 | 1300 | 0.63 | 100 | 5.13 | 3.07 | 1.25 | 5 | 1 | O | 939 |
| E4 | 500 | 0.67 | 1000 | 4.78 | 3.76 | 1.19 | 4 | 2 | O | 931 |
| E5 | 1300 | 0.63 | 1000 | 5.02 | 2.31 | 1.31 | 4 | 1 | O | 956 |
| E6 | 500 | 1.00 | 100 | 2.73 | 5.34 | 1.23 | 1 | 3 | O | 947 |
| E7 | 500 | 1.50 | 100 | 0.91 | 5.41 | 1.43 | 0 | 3 | O | 944 |
| E8 | 1250 | 1.50 | 100 | 0.77 | 3.15 | 1.54 | 0 | 1 | O | 924 |
| E9 | 1250 | 1.50 | 1000 | 0.83 | 2.88 | 1.61 | 0 | 1 | O | 971 |
| C1 | 400 | 0.67 | 100 | 4.79 | 7.24 | 1.05 | 4 | 7 | O | — |
| C2 | 1400 | 0.63 | 100 | 5.06 | 1.61 | 1.78 | 5 | 1 | X | 547 |
| C3 | 1400 | 0.63 | 1000 | 4.95 | 0.88 | 1.91 | 4 | 1 | X | 554 |
| C4 | 500 | 0.67 | 1500 | 4.8 | 1.29 | 1.84 | 4 | 1 | X | 582 |
| C5 | 500 | 0.67 | 10 | 4.57 | 8.57 | 1.03 | 3 | 9 | O | — |
| C6 | 1300 | 0.63 | 10 | 5 | 6.71 | 1.05 | 4 | 6 | O | — |
| C7 | 1300 | 0.49 | 100 | 7.03 | 3.01 | 1.14 | 10 | 1 | X | 321 |
| C8 | 1300 | 1.60 | 100 | 0.29 | 3 | 2.02 | 0 | 1 | X | 634 |
| C9 | 1300 | 0.55 | 100 | 6.30 | 2.96 | 1.18 | 8 | 1 | X | 433 |

Discussion

According to the experimental results shown in Table 1, because a chloride peak located between 20% and 80% of the relative depth ratio in the TOF-SIMS spectrum of each of the electrolytic copper foils of Examples 1 to 9 was characterized by the maximum relative intensity of chloride versus copper ranging from 0.77% to 5.13% and the FWHM ranging from 2.31% to 5.78%, the degree of warpage of four corners of each of the electrolytic copper foils was controlled to be less than or equal to 3 mm. Therefore, the electrolytic copper foils could be coated with the negative electrode slurry uniformly, and the charge-discharge cycle life of the lithium-ion cells of Examples 1B to 9B was each improved to more than or equal to 900 times, or even more than or equal to 1000 times.

In contrast, since the chloride peak in the TOF-SIMS spectrum of each of the electrolytic copper foils of Comparative Examples 1 to 9 failed to simultaneously have the characteristics of the maximum relative intensity of chloride versus copper ranging from 0.77% to 5.13% and the FWHM ranging from 2.31% to 5.78%, the degree of warpage of each of the electrolytic copper foils of Comparative Examples 1 to 9 was too high and/or the coating uniformity thereof was poor. Therefore, the charge-discharge cycle life of the lithium-ion cells of Comparative Examples 1B to 9B was each less than 650 times. The experimental results showed that the performance of the lithium-ion cells of Comparative Examples 1B to 9B was significantly inferior to that of Examples 1B to 9B.

Herein, it should be noted that when the FWHM of the chloride peak in the TOF-SIMS spectrum was more than 5.78% (e.g., the electrolytic copper foil of each of Comparative Examples 1, 5, and 6), the degree of warpage of the electrolytic copper foil was so high that the electrolytic copper foil was evaluated as not suitable for a lithium-ion cell in advance. Therefore, the charge-discharge cycle life of each of the lithium-ion cells of Comparative Examples 1B, 5B, and 6B was marked "-" in Table 1.

From the experimental results of the FWHM of the chloride peak in each of the TOF-SIMS spectra, when the FWHM of the chloride peak was less than 2.31% (e.g., the electrolytic copper foil of each of Comparative Examples 2 and 4), the coating uniformity of the negative electrode slurry applied on the electrolytic copper foil was poor, and therefore the charge-discharge cycle life of each of the lithium-ion cells of Comparative Examples 2B to 4B was less than 600 times.

From the experimental results of the maximum relative intensity of chloride versus copper of the chloride peak in each of the TOF-SIMS spectra, when the maximum relative intensity of chloride versus copper of the chloride peak was more than 5.13% (e.g., the electrolytic copper foil of each of Comparative Examples 7 and 9) or less than 0.77% (e.g., the electrolytic copper foil of Comparative Example 8), the electrolytic copper foils were hard to be coated with the negative electrode slurry uniformly during producing a lithium-ion cell, and therefore the charge-discharge cycle life of each of the lithium-ion cells of Comparative Examples 2B to 4B was less than 650 times.

From the experimental results of Table 1, since the chloride peak in the TOF-SIMS spectrum of each of the electrolytic copper foils of Examples 1 to 9 simultaneously had the characteristics of the maximum relative intensity of chloride versus copper ranging from 0.77% to 5.13% and the FWHM ranging from 2.31% to 5.78%, the density of the copper particles of each of the electrolytic copper foils of Examples 1 to 9 was less than or equal to 5 particles/m². Therefore, during producing a lithium-ion cell, the coating uniformity of the negative electrode slurry applied on each of the electrolytic copper foils of Examples 1 to 9 was good, thereby enabling good performance on the charge-discharge cycle life of each of the lithium-ion cells of Examples 1B to 9B.

In contrast, since the density of the copper particles of each of the electrolytic copper foils of Comparative Examples 7 and 9 was too high, the coating uniformity of the negative electrode slurry applied on each of the electrolytic copper foils was quite unsatisfactory. Therefore, the charge-discharge cycle life performance of each of the lithium-ion cells of Comparative Examples 7B to 9B was obviously poor and less than 500 times.

In addition, the ratio of Ry/Rz of each of the electrolytic copper foils of Examples 1 to 9 fell within a range from 1.09 to 1.7. In contrast, the ratio of Ry/Rz of each of the electrolytic copper foils of Comparative Examples 2 to 4 and 8 was high above 1.7. Therefore, the coating uniformity of the negative electrode slurry applied on the electrolytic copper foils of Comparative Examples 2 to 4 and 8 was poor, thus deteriorating the charge-discharge cycle life performance of each of the lithium-ion cells of Comparative Examples 2B to 4B and 8B.

Furthermore, from the maximum relative intensity of chloride versus copper of the chloride peak in the TOF-SIMS spectrum of each of the electrolytic copper foils of Examples 1 to 9, when the maximum relative intensity of chloride versus copper was further controlled within a range of 0.77% to 4.70%, the density of the copper particles of each of the electrolytic copper foils of Examples 1, 2 and 6 to 9 was controlled at less than 3 particles/m$^2$, thereby ensuring the coating uniformity of the negative electrode slurry applied on each of the electrolytic copper foils of Examples 1, 2 and 6 to 9 to be further improved.

In summary, by controlling the values of the maximum relative intensity of chloride versus copper and the FWHM of the chloride peak in the TOF-SIMS spectrum of the electrolytic copper foil, the degree of warpage of the electrolytic copper foil is significantly decreased, and the coating uniformity of the negative electrode slurry applied on the electrolytic copper foil is improved, thereby optimizing the charge-discharge cycle life performance and the overall efficiency of the lithium-ion cell.

Even though numerous characteristics and advantages of the present invention have been set forth in the foregoing description, together with details of the structure and features of the present invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An electrolytic copper foil, comprising copper and chloride, the electrolytic copper foil analyzed by time of flight secondary ion mass spectrometry (TOF-SIMS) along its thickness direction to obtain a TOF-SIMS spectrum of a relative depth ratio as X-axis and a relative intensity of chloride versus copper as Y-axis, the relative depth ratio being a ratio of an etch depth to the thickness of the electrolytic copper foil, and the relative intensity of chloride versus copper being a ratio of the intensity of the chloride to the intensity of the copper;
   wherein a chloride peak is located between 20% and 80% of the relative depth ratio in the TOF-SIMS spectrum, and the chloride peak is characterized by a maximum relative intensity of chloride versus copper ranging from 0.77% to 5.13% and a full width at half maximum ranging from 2.31% to 5.78%.

2. The electrolytic copper foil as claimed in claim 1, wherein the maximum relative intensity of chloride versus copper of the chloride peak ranges from 0.77% to 4.70%.

3. The electrolytic copper foil as claimed in claim 1, wherein the full width at half maximum of the chloride peak ranges from 2.31% to 4%.

4. The electrolytic copper foil as claimed in claim 1, wherein the time of flight secondary ion mass spectrometry analysis is performed by using cesium ions (Cs$^+$) as a sputter ion source and applying an acceleration voltage of 2000 electron volts in an etch area of 250 μm*250 μm.

5. The electrolytic copper foil as claimed in claim 2, wherein the time of flight secondary ion mass spectrometry analysis is performed by using cesium ions (Cs$^+$) as a sputter ion source and applying an acceleration voltage of 2000 electron volts in an etch area of 250 μm*250 μm.

6. The electrolytic copper foil as claimed in claim 3, wherein the time of flight secondary ion mass spectrometry analysis is performed by using cesium ions (Cs$^+$) as a sputter ion source and applying an acceleration voltage of 2000 electron volts in an etch area of 250 μm*250 μm.

7. The electrolytic copper foil as claimed in claim 1, wherein a ratio of a maximum height to a ten-point mean roughness (Ry/Rz) of a surface of the electrolytic copper foil ranges from 1.09 to 1.7.

8. The electrolytic copper foil as claimed in claim 2, wherein a ratio of a maximum height to a ten-point mean roughness (Ry/Rz) of a surface of the electrolytic copper foil ranges from 1.09 to 1.7.

9. The electrolytic copper foil as claimed in claim 3, wherein a ratio of a maximum height to a ten-point mean roughness (Ry/Rz) of a surface of the electrolytic copper foil ranges from 1.09 to 1.7.

10. The electrolytic copper foil as claimed in claim 1, wherein the electrolytic copper foil comprises substantially no roughening-treated layer.

11. The electrolytic copper foil as claimed in claim 2, wherein the electrolytic copper foil comprises substantially no roughening-treated layer.

12. The electrolytic copper foil as claimed in claim 3, wherein the electrolytic copper foil comprises substantially no roughening-treated layer.

13. The electrolytic copper foil as claimed in claim 1, wherein the electrolytic copper foil comprises copper particles on a surface thereof, a density of the copper particles of the surface of the electrolytic copper foil is less than or equal to 5 particles per square meter, and the particle size of the copper particles ranges from 5 micrometers to 100 micrometers.

14. The electrolytic copper foil as claimed in claim 2, wherein the electrolytic copper foil comprises copper particles on a surface thereof, a density of the copper particles of the surface of the electrolytic copper foil is less than or equal to 5 particles per square meter, and the particle size of the copper particles ranges from 5 micrometers to 100 micrometers.

15. The electrolytic copper foil as claimed in claim 3, wherein the electrolytic copper foil comprises copper particles on a surface thereof, a density of the copper particles of the surface of the electrolytic copper foil is less than or equal to 5 particles per square meter, and the particle size of the copper particles ranges from 5 micrometers to 100 micrometers.

16. The electrolytic copper foil as claimed in claim 7, wherein the electrolytic copper foil comprises copper particles on the surface thereof, a density of the copper particles of the surface of the electrolytic copper foil is less than or equal to 5 particles per square meter, and the particle size of the copper particles ranges from 5 micrometers to 100 micrometers.

17. The electrolytic copper foil as claimed in claim 8, wherein the electrolytic copper foil comprises copper particles on the surface thereof, a density of the copper particles of the surface of the electrolytic copper foil is less than or equal to 5 particles per square meter, and the particle size of the copper particles ranges from 5 micrometers to 100 micrometers.

18. The electrolytic copper foil as claimed in claim 9, wherein the electrolytic copper foil comprises copper particles on the surface thereof, a density of the copper particles of the surface of the electrolytic copper foil is less than or equal to 5 particles per square meter, and the particle size of the copper particles ranges from 5 micrometers to 100 micrometers.

19. An electrode of a lithium-ion cell, comprising the electrolytic copper foil as claimed in claim 1.

20. A lithium-ion cell, comprising the electrode as claimed in claim 19.

\* \* \* \* \*